July 8, 1958
L. L. SIMKINS
2,842,741
PORTABLE ELECTRICAL TESTING INSTRUMENT
WITH PROD RETAINING CASE
Filed Oct. 29, 1951
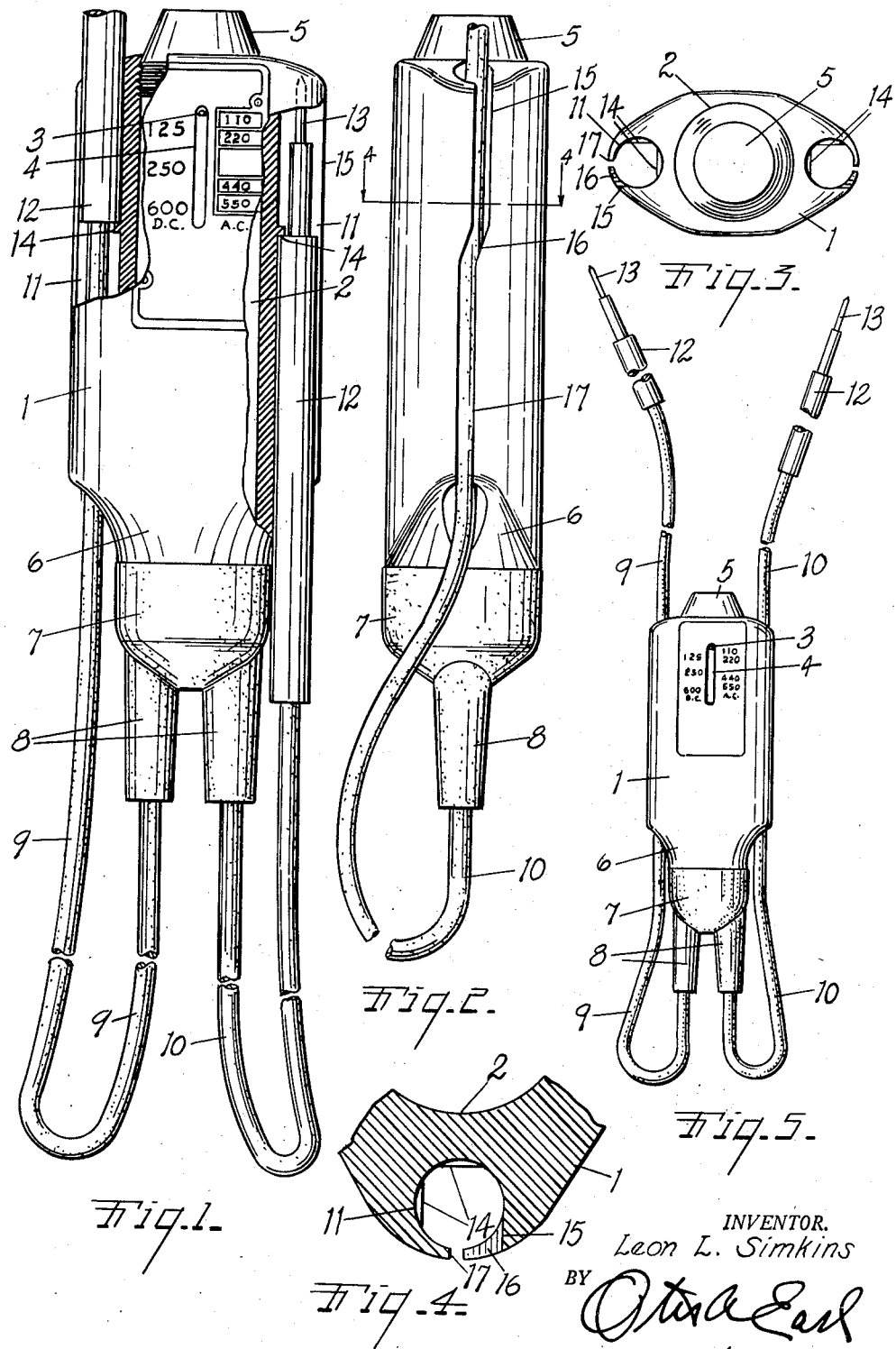
INVENTOR.
Leon L. Simkins
BY
ATTORNEY.

2,842,741

PORTABLE ELECTRICAL TESTING INSTRUMENT WITH PROD RETAINING CASE

Leon L. Simkins, Kalamazoo, Mich., assignor, by mesne assignments, to Square D Company, Detroit, Mich., a corporation of Michigan Application October 29, 1951, Serial No. 253,664

3 Claims. (Cl. 324—149)

This invention relates to improvements in portable electrical testing instrument with prod retaining case.

The principal objects of this invention are:

First, to provide an electrical testing instrument of the portable or pocket variety having a case that is arranged to selectively retain the test prods associated with the instrument in enclosed protected position or in projecting supported engagement, in which either of the prods may be manually manipulated along with the instrument.

Second, to provide a case for an electrical testing instrument with prod receiving cavities along its sides that are slotted longitudinally to receive and retainingly guide the test leads connected to the prods of the instrument.

Third, to provide an electrical testing instrument with prod receiving bores in its case, the bores having stops therein that permit the prods to enter either end of the bores but not pass therethrough, the sides of the bores being slotted to accommodate the test leads connected to the prods when the rear ends of the prods are inserted in the bores.

Fourth, to provide a case for an electrical testing instrument which permits the test leads and prods of the instrument to be releasably connected to the case in a variety of positions for convenient carrying and use of the instrument in different positions.

Other objects and advantages of my invention will be apparent from a consideration of the following description and claims. The drawings, of which there is one sheet, illustrate a preferred form of the instrument.

Fig. 1 is a front elevational view of the instrument partially broken away in longitudinal cross section and illustrating two possible mounting positions of the prods relative to the case.

Fig. 2 is a side elevational view of the instrument with one test lead extending therethrough.

Fig. 3 is a top plan view of the case.

Fig. 4 is a fragmentary transverse cross sectional view through the case and one of the prod receiving bores therein.

Fig. 5 is a front elevational view of the instrument with the test leads and prods in another convenient operating position.

My instrument includes a case 1 of generally elongated rectangular elevation and general oval transverse cross section as is apparent from Figs. 1 and 3. The case is conveniently made by molding from thermoplastic materials, but is not limited to this construction. The central body of the case defines or forms a central longitudinal passage or cavity 2 within which the electrical wiring and testing elements of the instrument are housed. The details of the electrical elements form no part of the present invention and so are not illustrated or described in detail. It is believed sufficient to an understanding of this invention to state that the instrument includes a longitudinally reciprocable armature having an indicator 3 that is visible through a slot 4 in the front of the case and associated with appropriate indicia to indicate the voltage or other electrical characteristics of a circuit to which the instrument is connected.

The upper end of the cavity 2 is closed by a plug 5 that may or may not include electrical indicating apparatus associated with the other electrical elements as desired. The lower end of the case 1 is extended in a general cylindrical neck 6 that receives and supports a flexible rubber boot or cap 7. The cap 7 is provided with two integral reinforcing legs 8 through which the test leads 9 and 10 enter the cavity 2. The leads are of the familiar rubber or insulated wire and are flexible.

The side edges of the case 1 define or form a pair of longitudinally extending bores 11 which extend longitudinally through the case and open at their lower ends alongside the neck 6. The bores 11 are of such a diameter as to freely slidably receive the stiff insulating handles 12 on the outer ends of the leads 9 and 10. Outwardly from the handles 12 the leads 9 and 10 are provided with bared and pointed prods 13 for connecting the leads and the instrument to an electrical circuit. Positioned about two-thirds of the way to the top of the bores 11 are rib-like stops 14 that project into the bores and prevent the passage of the handles 12 completely therethrough. The stops are conveniently formed by molding along with the rest of the case.

As is best illustrated in Fig. 1 the stops 14 are positioned longitudinally of the bores so that a prod 13 and handle 12 inserted into the bottom of the bore will be stopped with the prod enclosed and protected in the outer end of the bore. Alternatively the inner end of a handle may be inserted into the outer end of the bore for a substantial distance to rest upon the stop with the handle and prod projecting in rigid supported relation from the top of the case. In this latter position the case and one prod can be easily held and manipulated with one hand to make connections with the prod and conveniently read the instrument.

In order to permit the insertion of the inner ends of the handles into the outer ends of the bores without interference from the leads the outer side wall of each bore is longitudinally slotted to the exterior of the case as at 15. The slots 15 are positioned generally tangent to one side of the bore and extend downwardly to about the position of the stops 14. At the lower ends of the slots 15 are inclined slots 16 which connect with lower vertical slots 17 that are centered along the lower lengths of the bores. The slots 15, 16, and 17 are of such a width that the rubber covered test leads can be easily pressed laterally through the slots to position the leads in the bores when either of the handles 12 is inserted into the outer end of one of the bores.

The slotted side walls of the bores 11 permit both of the leads 9 and 10 to be extended through the bores with the prods located substantially above the case as is illustrated in Fig. 5. In this position the instrument and case will hang from the prods and leads while the prods are moved about to make various connections. The operator thus has both hands free to manipulate the prods without having to hold the instrument. The offset slots 15 and 17 in the sides of the bores provide an overlapping locking engagement with the test leads where they extend through the bores, and prevent the leads from accidentally working out of the bores and permitting the instrument to fall.

Preferably, the slots 15, 16, and 17 are slightly narrower than the diameter of the rubber covering or insulation on the leads so that the covering is deformed in being pressed into the slots to yieldably retain the leads in the slots.

Having thus described my invention, what I claim is new and desire to secure by Letters Patent is:

1. A case for an electrical instrument provided with a flexible lead extending from the instrument to a lead end face of an elongated insulating handle and electrically connected at the handle to a prod extending from an opposite prod end face of said handle, said lead and prod end faces defining spaced lead and prod shoulder areas, respectively, said case comprising walls defining an elongated passage extending through said case, a rigid stop intermediate of the ends of said passage, said passage being adapted to telescopically receive at least portions of said handle on opposite sides of said stop, selectively, said stop being adapted to engage said prod shoulder area with at least a portion of said prod within said passage when said handle is inserted into said passage on one side of said stop and to engage said lead shoulder area when said handle is inserted into said passage on the other side of said stop, and a continuous slot in said case opening into said passage along the entire length thereof on both said one and said other sides of said stop to permit said lead to enter transversely into said passage when said handle is inserted into said passage on said other side of said stop with said lead end face directed toward said stop, a lengthwise portion of said slot on said one side of said stop being offset circumferentially of said passage from another lengthwise portion of said slot on said one side of said stop.

2. An electrical instrument comprising an enclosing case, an elongated insulating handle separate from the case and having a lead end face and a prod end face, a flexible lead extending from the case to said lead end face, a prod extending from the prod end face, means electrically connecting said lead to said prod, said lead and prod end faces defining spaced lead and prod shoulder areas, respectively, said case having walls defining an elongated passage extending through said case, a rigid stop intermediate of the ends of said passage, said passage being adapted to telescopically receive at least portions of said handle on opposite sides of said stop, selectively, said stop being adapted to engage said prod shoulder area with at least a portion of said prod within said passage when said handle is inserted into said passage on one side of said stop and to engage said lead shoulder area when said handle is inserted into said passage on the other side of said stop, and a continuous slot in said case opening into said passage along the entire length thereof on both said one and said other sides of said stop to permit said lead to enter transversely into said passage when said handle is inserted into said passage on said other side of said stop with said lead end face directed toward said stop.

3. A case in accordance with claim 2 characterized in that said lead has a resilient deformable insulating cover and said slot is narrower than said passage and said cover, but wide enough to permit said transverse entry of said lead into said passage upon deformation of said cover.

References Cited in the file of this patent

UNITED STATES PATENTS

| | | |
|---|---|---|
| 737,997 | Burk | Sept. 1, 1908 |
| 1,470,322 | Frederick | Oct. 9, 1923 |
| 2,283,544 | Eaton | May 19, 1942 |
| 2,458,628 | Okum | Jan. 11, 1949 |
| 2,481,610 | Meighan | Sept. 13, 1949 |
| 2,581,497 | Podell | Jan. 8, 1952 |
| 2,586,203 | Boyle | Feb. 19, 1952 |
| 2,632,785 | Knopp | Mar. 24, 1953 |